(12) United States Patent
Fifield et al.

(10) Patent No.: US 7,772,918 B2
(45) Date of Patent: Aug. 10, 2010

(54) REGULATED VOLTAGE BOOST CHARGE PUMP FOR AN INTEGRATED CIRCUIT DEVICE

(75) Inventors: John A. Fifield, Underhill, VT (US); Bradford Hunter, S. Burlington, VT (US); Todd M. Rasmus, Cary, NC (US); Michael A. Sorna, Hopewell Junction, NY (US); Daniel W. Storaksa, Walden, NY (US)

(73) Assignee: International Business Machines Corporation, Armonk, NY (US)

( * ) Notice: Subject to any disclaimer, the term of this patent is extended or adjusted under 35 U.S.C. 154(b) by 287 days.

(21) Appl. No.: 12/104,132

(22) Filed: Apr. 16, 2008

(65) Prior Publication Data

US 2009/0261890 A1    Oct. 22, 2009

(51) Int. Cl.
*G05F 1/10* (2006.01)
*H02M 7/00* (2006.01)

(52) U.S. Cl. .................. 327/536; 327/537; 363/59; 363/60

(58) Field of Classification Search .......... 363/59, 363/60; 307/109, 110; 327/536, 537
See application file for complete search history.

(56) References Cited

U.S. PATENT DOCUMENTS

| | | | |
|---|---|---|---|
| 4,807,104 A * | 2/1989 | Floyd et al. | 363/59 |
| 6,021,056 A * | 2/2000 | Forbes et al. | 363/60 |
| 6,859,091 B1 * | 2/2005 | Nicholson et al. | 327/536 |
| 7,209,373 B2 * | 4/2007 | Oicles et al. | 363/59 |
| 7,279,957 B2 * | 10/2007 | Yen | 327/536 |

* cited by examiner

*Primary Examiner*—Bao Q Vu
(74) *Attorney, Agent, or Firm*—Dillon & Yudell LLP (57) ABSTRACT

An apparatus and method for a regulated voltage boost charge pump for an integrated circuit (IC) device. The charge pump generally includes a plurality of switching networks and a lift capacitor that are intermittently coupled to an output capacitor or to a regulating transistor, a differential error amplifier biasing a gate terminal of the transistor, and a controller configured to alternate states of switches in the switching networks in a pre-selected timing relationship with a clock signal of the IC device.

18 Claims, 5 Drawing Sheets

REGULATED VOLTAGE BOOST CHARGE PUMP FOR AN INTEGRATED CIRCUIT DEVICE

BACKGROUND

1. Technical Field

The present invention generally relates to integrated circuit devices and in particular to regulated voltage boost charge pumps for integrated circuit devices.

2. Description of the Related Art

As complexity of integrated circuits (ICs) increases, lower supply voltages and smaller nomenclature of such voltages are implemented to reduce power consumption and heat dissipation in IC devices. Whereas most functional components are compatible with nominal supply voltages provided to IC devices, there are several classes of components (e.g., voltage regulators, bandgap reference generators, and the like), which require for their operation non-nominal voltages greater than the nominal supply voltages.

Such non-nominal voltages are generated in IC devices using voltage boost charge pumps, which typically are unregulated voltage sources having relatively high levels of voltage noise and ripple. However, despite advantages of regulated power sources, generation of regulated non-nominal voltages in IC devices represents a challenging task, and improvements in the voltage boost charge pumps are desirable.

SUMMARY OF ILLUSTRATIVE EMBODIMENTS

Disclosed are an apparatus and method for a regulated voltage boost charge pump for an integrated circuit (IC) device.

In embodiments of the present invention, a regulated voltage boost charge pump comprises a charging circuit having (i) a first network including a first switch connected in series with a second switch and having a first input connected to a voltage rail of a DC voltage source and a first output, a second network including a third switch connected in series with a fourth switch and having a second input connected to the voltage rail and a second output, a first capacitor connected between a common node of the first and second switches and a common node of the third and fourth switches, (ii) an output capacitor connected between the first output and a ground rail of the voltage source and coupled to an output terminal of the charge pump, (iii) a regulating transistor connected between the second output and the ground rail, (iv) a feedback module including a differential error amplifier having a first input network and a second input network and an output connected to a gate terminal of the transistor, and (v) a controller configured for alternating states of the switches of the charging circuit in a pre-selected timing relationship with a clock signal of the IC device.

The above as well as additional features and advantages of the present invention will become apparent in the following detailed written description.

BRIEF DESCRIPTION OF THE DRAWINGS

The invention itself will best be understood by reference to the following detailed description of an illustrative embodiment when read in conjunction with the accompanying drawings, wherein.

DETAILED DESCRIPTION OF AN ILLUSTRATIVE EMBODIMENT

The illustrative embodiments provide an apparatus and method for a regulated voltage boost charge pump for integrated circuit (IC) devices.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical, and other changes may be made without departing from the spirit or scope of the present invention. The following detailed description is, therefore, not to be taken in a limiting sense, and the scope of the present invention is defined only by the appended claims.

Within the descriptions of the figures, similar elements are provided similar names and reference numerals as those of the previous figure(s), except that suffixes may be added, when appropriate, to differentiate such elements. The specific numerals assigned to the elements are provided solely to aid in the description and not meant to imply any limitations (structural or functional) on the invention.

It is understood that the use of specific component, device and/or parameter names are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that term is utilized.

Figure 1:
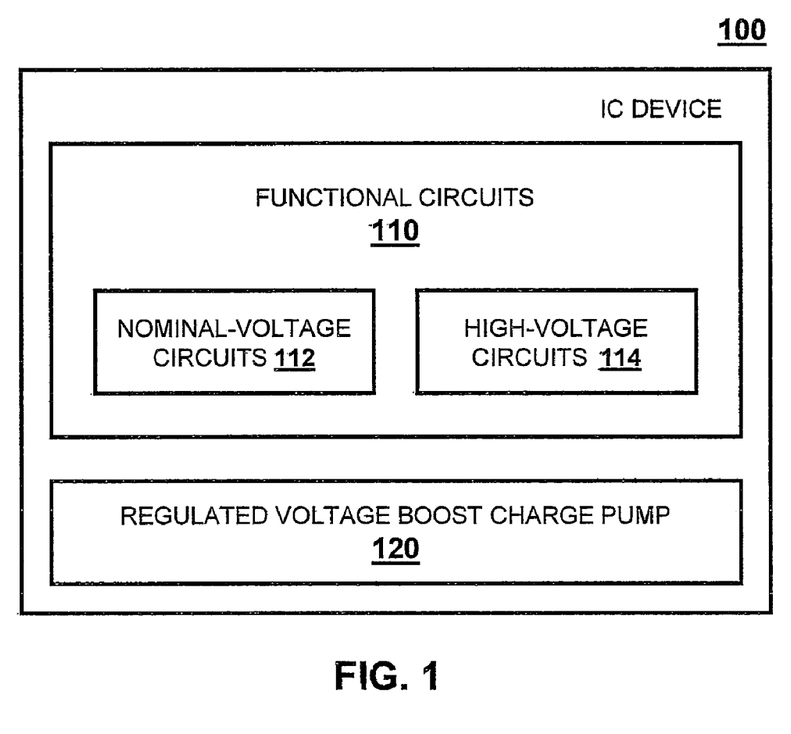
FIG. 1 is a block diagram of an exemplary integrated circuit (IC) device having a regulated voltage boost charge pump configured for implementing one or more embodiments of the invention.

With reference now to the figures, FIG. 1 depicts a block diagram of exemplary IC device 100 comprising functional circuits 110 (e.g., CMOS functional circuits) and regulated voltage boost charge pump(s) 120. IC device 100 may, for example, be a microprocessor, an application-specific IC (ASIC), a field-programmable gate array (FPGA), or a memory array, among other types of IC devices. Functional circuits 110 generally include nominal-voltage CMOS circuits 112 operating at nominal supply voltage $V_{DD}$ sufficient to produce high/low logic voltages in components of the circuits 112, and high-voltage CMOS circuits 114 (e.g., bandgap reference generators, voltage regulators, and the like), which require for their operation supply voltage $V_{HV}$, which is greater than nominal supply voltage $V_{DD}$. In IC 100, voltage $V_{HV}$ is provided to high-voltage CMOS circuits 114 by in-situ regulated voltage boost charge pump(s) 120.

Figure 2:
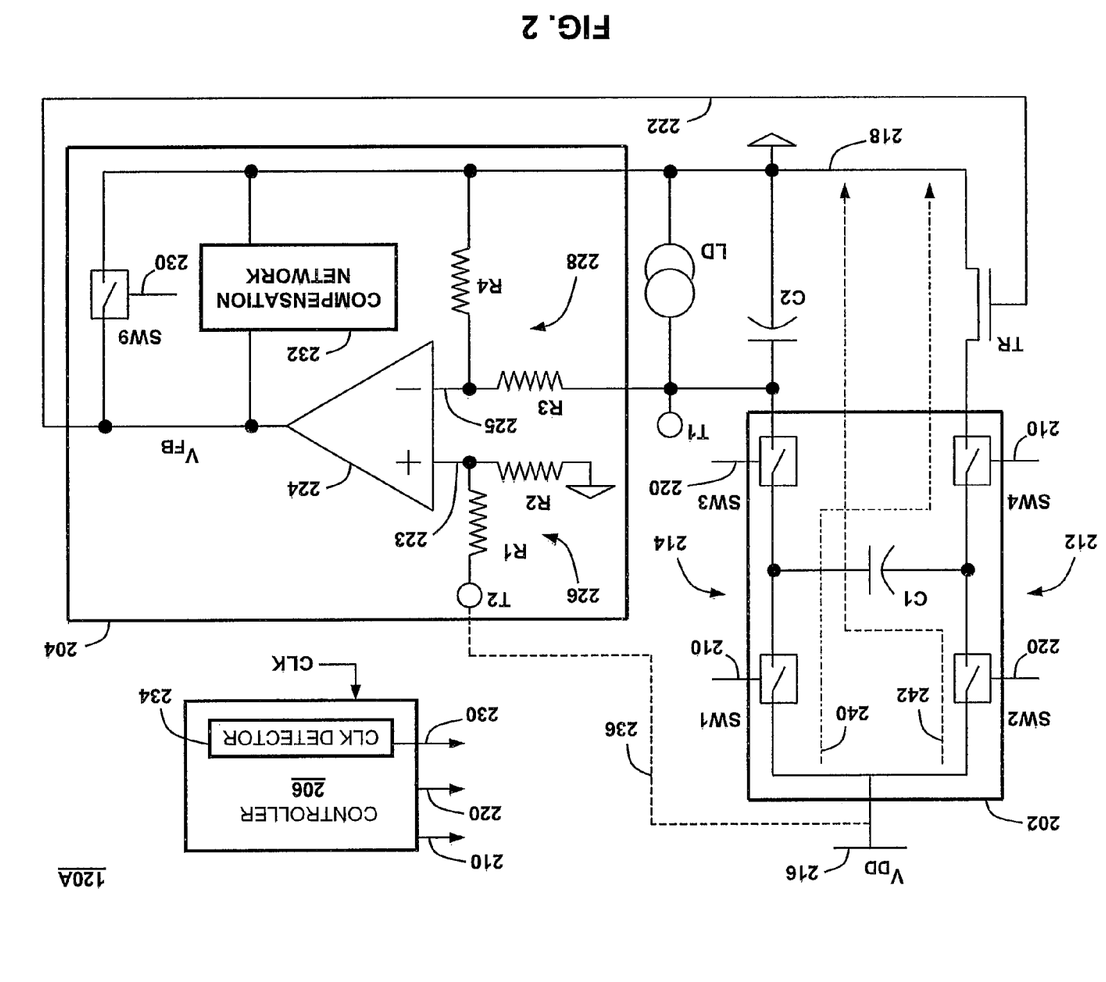
FIG. 2 is a functional circuit configuration of a regulated voltage boost charge pump in which the features of the invention are implemented, according to one embodiment of the invention.
Figure 3:
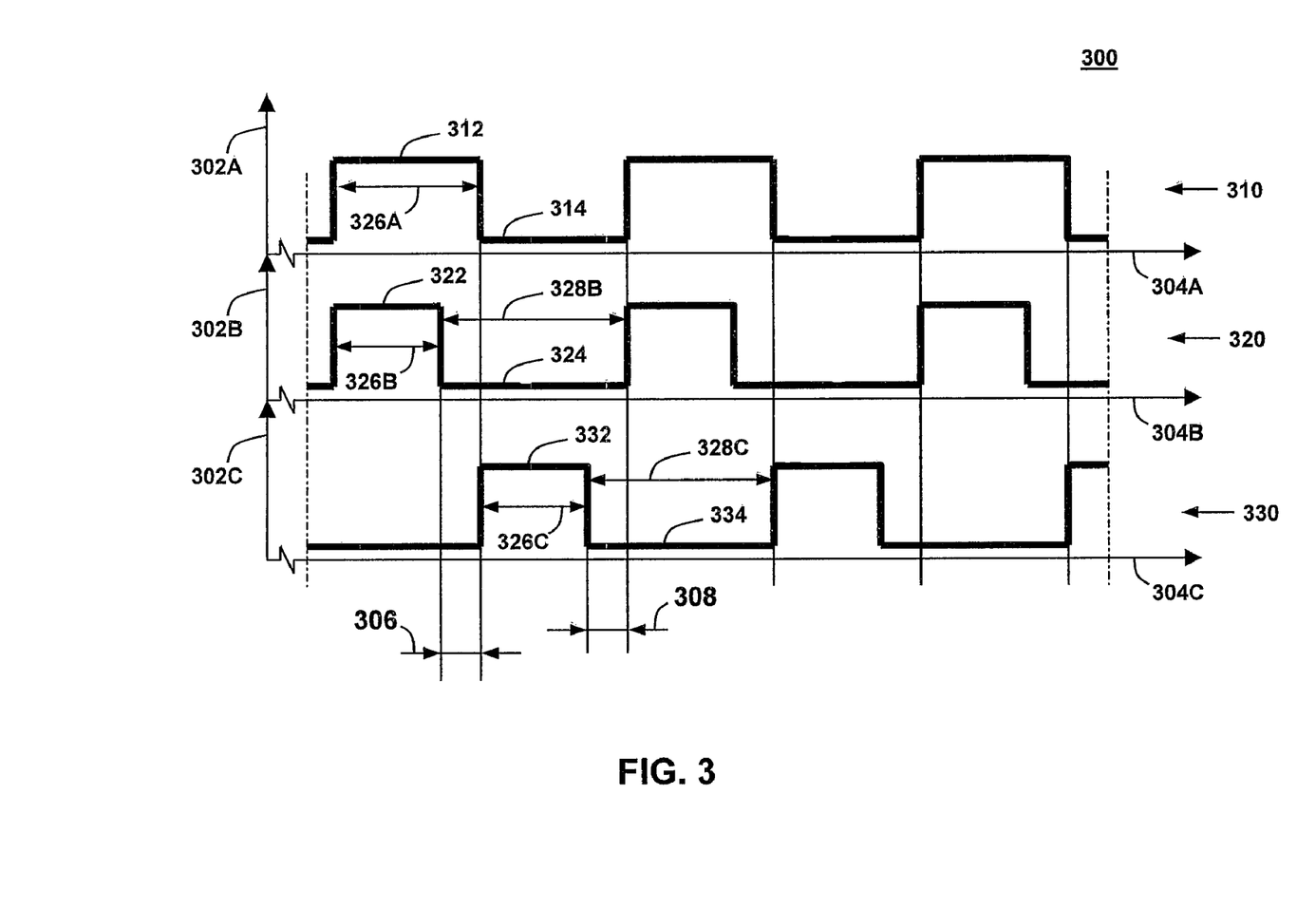
FIG. 3 is a series of timing diagrams illustrating operation of the regulated voltage boost charge pump of FIG. 2.

With reference now to FIGS. 2 and 3, therein are described illustrative embodiments of the invention. FIG. 2 depicts a functional circuit configuration of regulated voltage boost charge pump 120A, in which an embodiment of the invention is implemented, and FIG. 3 depicts a series of timing diagrams illustrating operation of charge pump 120A. Although the features illustrated in FIGS. 2 and 3 may be described with reference to components shown in FIG. 1, it should be understood that this is merely for convenience and alternative components and/or configurations thereof can be employed when implementing embodiments of the invention.

Referring to FIG. 2, regulated voltage boost charge pump 120A comprises charging circuit 202, output capacitor C2 coupled to output terminal T1, transistor TR, feedback module 204, and controller 206 having detector 234 of clock signal CLK of IC device 100. In operation, charge pump 120A provides voltage $V_{HV}$ to high-voltage CMOS circuits 114 of IC device 100, which are collectively shown as load LD. In alternate embodiments (not shown), IC device 100 may comprise a plurality of boost charge pump 120A, each such pump providing particular voltage $V_{HV}$.

Charging circuit 202 comprises first network 212 including switch SW1 connected in series with switch SW4, second network 214 including switch SW2 connected in series with switch SW3, and a capacitor C1 connected between common modes of switches SW1, SW4 and SW2, SW3. Illustratively, switches SW1-SW4 (e.g., P-channel CMOS switches) are shown in an "open" state. In operation, states of switches SW1-SW4 are selectively determined and alternated by output signals 210 and 220 of controller 206, which have a pre-selected timing relationship with clock signal CLK of IC device 100, as discussed in detail below in reference to FIG. 3.

Input leads of charge networks 212, 214 are connected to power rail 216 coupled to an output of a source (not shown) of positive nominal supply voltage $V_{DD}$. Correspondingly, output leads of charge networks 212 and 214 are connected to ground rail 218 of that source/IC device 100 via regulating transistor TR (e.g., CMOS transistor) and output capacitor C2, respectively. Impedance of transistor TR is controlled by signal $V_{FB}$ at output 222 of feedback module 204.

Feedback module 204 includes differential error amplifier 224 (for example, CMOS operational amplifier) having first input network 226 and second input network 228, protection switch SW9, and compensation network 232. First and second input networks 226, 228 comprise resistors R1, R2 and R3, R4, respectively. Common node of input network 226 is connected to non-inverting input 223 of error amplifier 224, input lead of resistor R1 is connected to terminal T2 of feedback module 204, and output lead of resistor R2 is connected to ground rail 218. Correspondingly, common node of input network 228 is connected to inverting input 225 of error amplifier 224, input lead of resistor R3 is connected to output capacitor C2, and output lead of resistor R4 is connected to ground rail 218.

In one embodiment, terminal T2 is coupled to power rail 216 (shown, with broken line, using link 236). In an alternate embodiment, terminal T2 may be coupled (not shown) to an output of an in-situ or remote source of a positive reference DC voltage $V_{REF}$. In operation, charging circuit 202, transistor TR, output capacitor C2, and feedback module 204 form, together, a close-loop control circuit, which defines the value and stabilizes output voltage $V_{C2}$.

In charge pump 120A, the value of output voltage $V_{C2}$ may be calculated from an equation $V_{C2}*[R4/(R3+R4)]=V_{T2}*[(R2/(R1+R2)]$, wherein voltage $V_{T2}$ is voltage $V_{DD}$ or, alternatively, reference voltage $V_{REF}$. By selecting values of resistors R1-R4 and/or reference voltage $V_{REF}$, the output voltage $V_{C2}$ may be regulated and, in particular, made equal to voltage $V_{HV}$ required for powering high-voltage CMOS circuits 114. Additionally, close-loop control of output voltage $V_{C2}$ results in generation of the output voltage having low levels of noise and ripples.

Protection switch SW9 and compensation network 232 are connected between output 222 of feedback module 204/error amplifier 224 and ground rail 218. Control input of switch SW9 is coupled to output 230 of detector 234 of clock signal CLK. In operation, compensation network 232 stabilizes gain factor of error amplifier 224, and protection switch SW9 prevents the output voltage of charge pump 120A from overshooting during power-on once clock signal CLK begins transitioning. In particular, when no transitions of clock signal CLK are detected, switch SW9 is set to a "closed" state, thus coupling output 222 to ground rail 218.

Referring to FIG. 3, therein is depicted an exemplary series 300 of timing diagrams of clock signal CLK (graph 310, y-axis 302A) and signals 210 (graph 320, y-axis 302B) and 220 (graph 330, y-axis 302C) versus time (axes 304A-304C, respectively). Illustratively, clock signal CLK and signals 210, 220 are voltages alternating between logic high levels 312, 322, and 332 and logic low levels 314, 324, and 334, respectively.

In the depicted embodiment, logic high state 322 corresponds to "closed" states of switches SW1 and SW4, and low level 324 corresponds to "open" states of switches SW1 and SW4. Likewise, logic high levels 332 corresponds to "closed" states of switches SW2 and SW3, and logic low level 334 corresponds to "open" states of switches SW2 and SW3.

Durations 326B and 336C of "closed" states of switches SW1 thru SW4 do not overlap and are separated by time intervals 306 and 308. During time intervals 306 and 308, switches SW1 thru SW4 are set to the "open" state. In one exemplary embodiment, time intervals 306 and 308 have the same duration.

In each cycle of clock signal CLK, via interface 210 switches SW1, SW4 are set to (i) "closed" state during time interval 326B and (ii) "open" state during time intervals 306, 326C, and 308 (i.e., during time interval 328B). Correspondingly, in each cycle of clock signal CLK, via interface 220 switches SW2, SW3 are set to (i) "closed" state during time interval 326C and (ii) "open" state during time intervals 306, 326B, and 308 (i.e., during time interval 328C). Therefore, "open" and "closed" states of switches SW1, SW4 and switches SW2, SW3 alternate with the periodicity of clock signal CLK and, additionally, "closed" states of these groups of switches are separated from one another by time intervals 306, 308.

Referring back to FIG. 2, during time interval 326B, current flows from power rail 216 through switch SW1, capacitor C1, switch SW4, and transistor TR to ground rail 218 (shown, in phantom, with arrow 240), thus resulting in charging capacitor C1 to voltage $V_{C1}$, which is a function of duration of time interval 326B and values of capacitor C1 and impedance $R_{TR}$ of transistor TR. In operation, impedance $R_{TR}$ is determined by output voltage $V_{FB}$, which is produced by error amplifier 224 and applied to a gate terminal of transistor TR.

Correspondingly, during time intervals 326C, current flows from power rail 216 through switch SW2, capacitor C1, switch SW3, and output capacitor C2 to ground rail 218 (shown, in phantom, with arrow 242). During time intervals 326C, output capacitor C2 is eventually charged to a predetermined output voltage $V_{HV}$ of charge pump 120A, i.e., $V_{C2}=V_{HV}$. Output capacitor C2 is charged during time intervals 326C, however, continuously provides (i.e., discharges) into load LD.

Figure 4A:
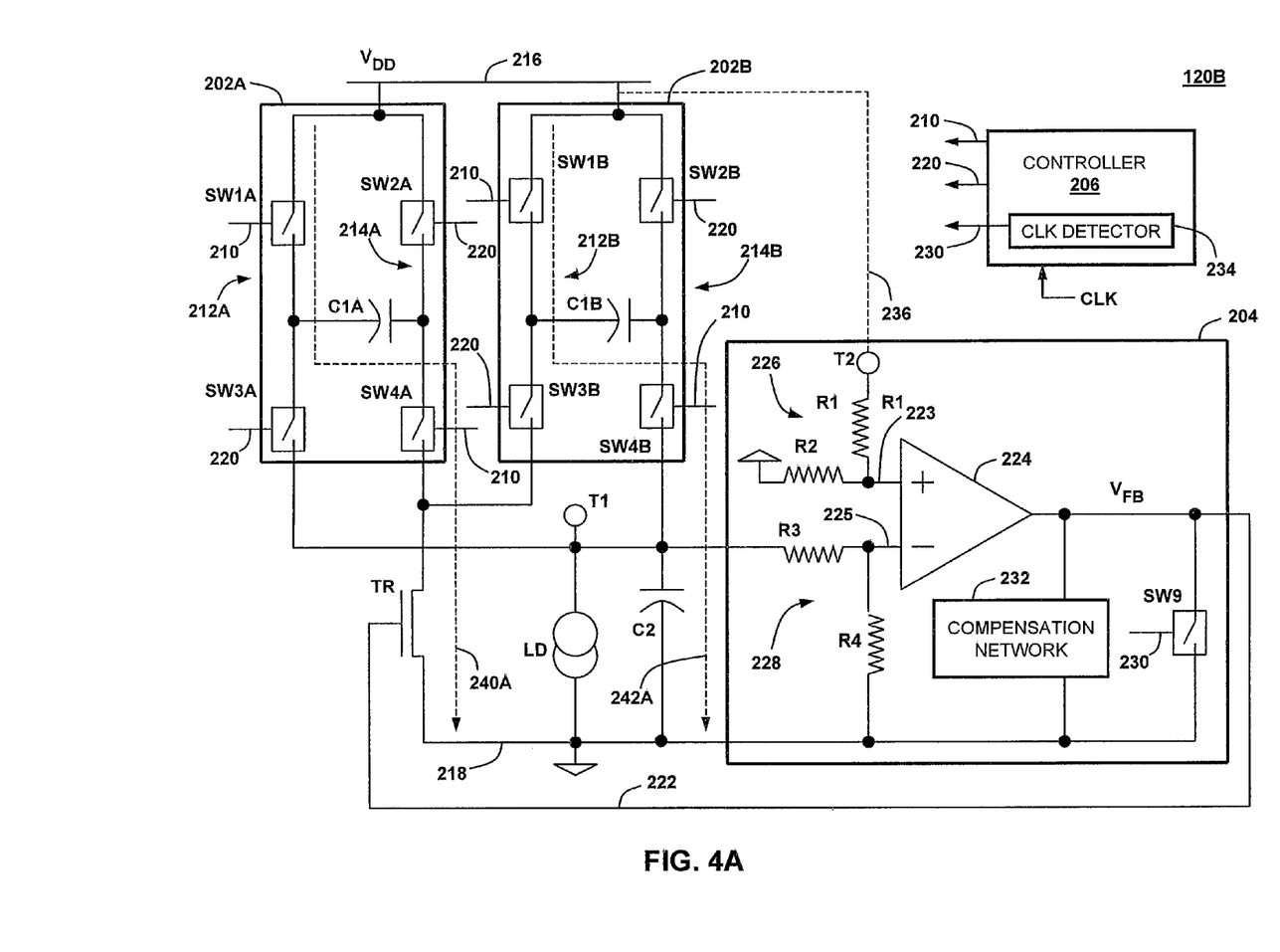
FIGS. 4A-4B depict a functional circuit configuration of another embodiment of a regulated voltage boost charge pump in which the features of the invention are implemented, according to one embodiment of the invention.
Figure 4B:
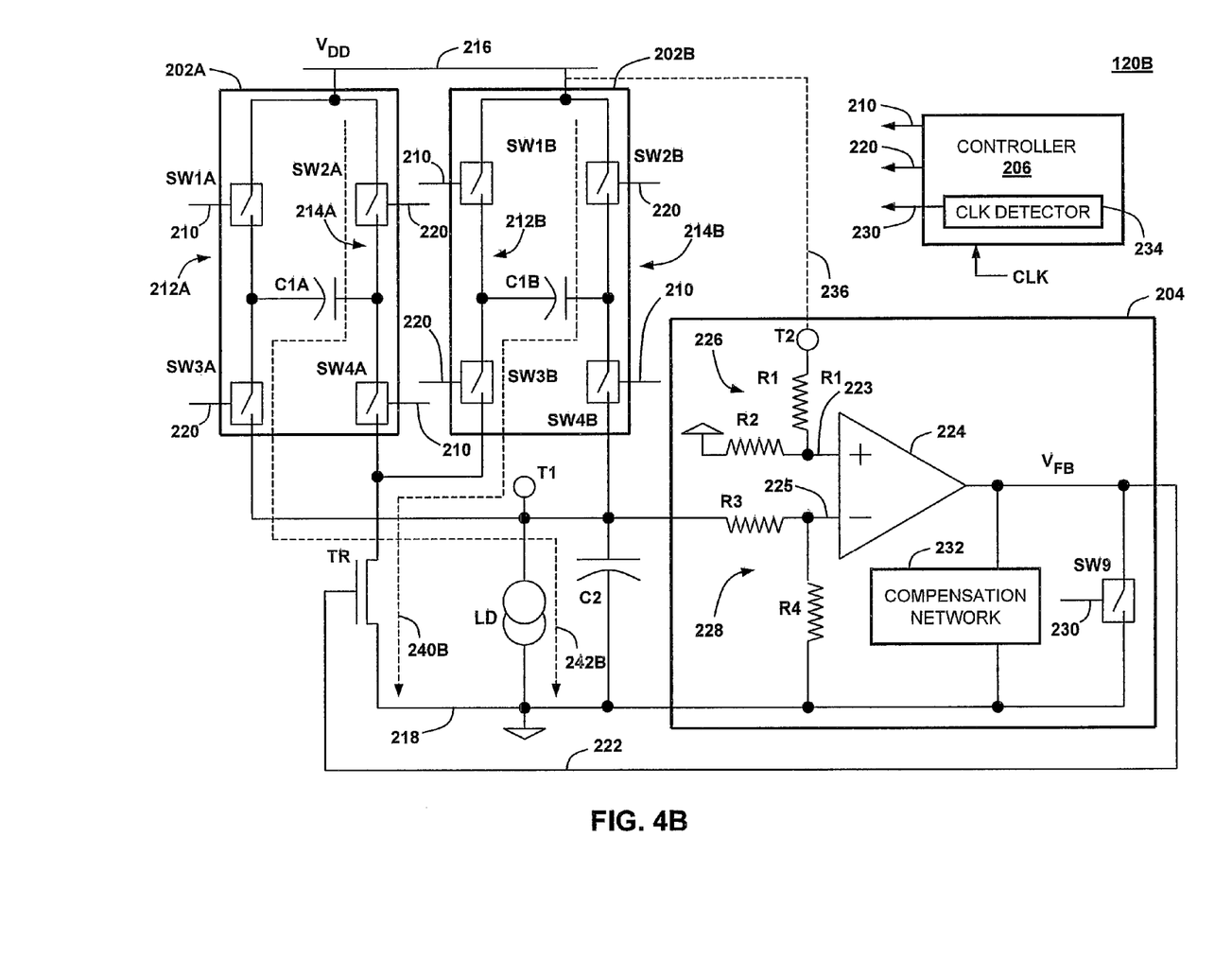

With reference now to FIGS. 4A-4B, therein is described another illustrative embodiment of the invention. FIGS.

4A-4B depict a functional circuit configuration of regulated voltage boost charge pump 120B, in which another embodiment of the invention is implemented. Although the features illustrated in FIGS. 4A-4B may be described with reference to components shown in FIG. 2, it should be understood that this is merely for convenience and alternative components and/or configurations thereof can be employed when implementing such an embodiment of the invention.

Referring to FIG. 4A, regulated voltage boost charge pump 120B comprises charging circuits 202A and 202B, output capacitor C2 coupled to output terminal T1, regulating transistor TR, feedback module 204, and controller 206. An output lead of network 212A is connected to transistor TR and an output lead of network 214A is connected to output capacitor C2. Correspondingly, an output lead of network 212B is connected to output capacitor C2 and an output lead of network 214B is connected to transistor TR. Operations of charge pumps 120A and 120B are substantially similar, however, charge pumps 120B can power larger loads LD at lower levels of voltage noise and ripple than charge pump 120A, as discussed in detail below.

In charging circuits 202A and 202B, switches SW1A thru SW4A and SW1B thru SW4B are controlled by output signals 210 and 220 of controller 206 as discussed above in reference to charge pump 120A of FIG. 2. Specifically, in each cycle of clock signal CLK (i) switches SW1A, SW4A and SW1B, SW4B are set to "closed" states during time interval 326B and to "open" states during time intervals 306, 326C, and 308, and (i) switches SW2A, SW3A and SW2B, SW3B are set to "closed" states during time interval 326C and to "open" states during time intervals 306, 326B, and 308.

Referring to FIG. 4A, during time interval 326B, current flows (i) from power rail 216 through switch SW1A, capacitor C1A, switch SW4A, and transistor TR to ground rail 218 (shown, in phantom, with arrow 240A) and (ii) from power rail 216 through switch SW1B, capacitor C1B, switch SW4B, and output capacitor C2 to ground rail 218 (shown, in phantom, with arrow 242A).

Referring to FIG. 4B, during time interval 326C, current flows (i) from power rail 216 through switch SW2B, capacitor C1B, switch SW3B, and transistor TR to ground rail 218 (shown, in phantom, with arrow 240B) and (ii) from power rail 216 through switch SW2A, capacitor C1A, switch SW3A, and output capacitor C2 to ground rail 218 (shown, in phantom, with arrow 242B).

In regulated voltage boost charge pump 120B, output capacitor C2 is charged during time intervals 326B and 326C, i.e., twice during a period of clock signal CLK. In one exemplary embodiment, when values of capacitors C1 of FIG. 2 and C1A and C1B are equal to one another and, during each of time intervals 326B and 326C, output capacitor C2 is eventually charged to voltage pre-determined output voltage $V_{HV}$ of charge pump 120B provided to load LD. Since output capacitor C2 is charged twice during each period of clock signal CLK, charge pump 120B can provide power to larger loads LD (e.g., high-voltage CMOS circuits 114) and at lower levels of voltage noise and ripples than charge pump 120A.

Those of ordinary skill in the art will appreciate that hardware configurations depicted in FIGS. 1, 2 and 4 may vary. For example, other hardware components may be used in addition to or in place of the depicted components. The IC device 100 depicted in FIG. 1 may, for example, be a portion of a larger IC device or a system-on-chip (SoC), system-in-package (SiP), and system-in-module (SiM) device, as well as may incorporate some of such devices or elements thereof. Therefore, the architecture depicted in FIG. 1 is a basic illustration of an IC device, for which actual implementations may vary. Thus, the depicted example is not meant to imply architectural limitations with respect to the present invention.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. A voltage boost charge pump for an integrated circuit (IC) device, the charge pump comprising:
    a first network including a first switch connected in series with a second switch, the first network having (i) a first input connected to a voltage rail of a DC voltage source of the IC device and (ii) a first output;
    a second network including a third switch connected in series with a fourth switch, the second network having (i) a second input connected to the voltage rail and (ii) a second output;
    a first capacitor connected between a common node of the first and second switches and a common node of the third and fourth switches;
    an output capacitor connected between the first output and a ground rail of the DC voltage source, the output capacitor coupled to an output terminal of said charge pump;
    a regulating transistor connected between the second output and the ground rail;
    a feedback module including a differential error amplifier having a first input network, a second input network, and an output connected to a gate terminal of the transistor; and
    a controller configured for alternating states of said switches in a pre-selected timing relationship with a clock signal of the IC device.

2. The charge pump of claim 1, wherein:
    the first input network comprises a first resistor connected in series with a second resistor coupled to the ground rail;
    a common node of the first and second resistors is connected to a non-inverting input of the error amplifier; and
    an input node of the first resistor is connected to the voltage rail or an output a source of a reference voltage.

3. The charge pump of claim 1, wherein:
    the second input network comprises a third resistor connected in series with a fourth resistor coupled to the ground rail;
    a common node of the third and fourth resistors is connected to an inverting input of the error amplifier; and
    an input node of the third resistor is connected to the output capacitor.

4. The charge pump of claim 1, wherein the controller is configured to:
    set the first and fourth switches to the same state;
    set the second and third switches to a state that is the logical complement to a state of the first and fourth switches;
    selectively alternate states of (a) the first and fourth switches and (b) the second and third switches.

5. The charge pump of claim 4, wherein the controller is further configured to:
during alternation of the states, simultaneously retain said switches in an "open" state for a pre-selected duration of time.

6. The charge pump of claim 1, further comprising:
a third network including a fifth switch connected in series with a sixth switch, the third network having (i) a third input connected to the voltage rail and (ii) a third output connected to the second output;
a fourth network including a seventh switch connected in series with an eighth switch, the fourth network having (i) a fourth input connected to the voltage rail and (ii) a fourth output connected to the first output; and
a second capacitor connected between a common node of the fifth and sixth switches and a common node of the seventh and eighth switches.

7. The charge pump of claim 6, wherein the controller is configured to:
set to the same state (i) the first and fourth switches and (ii) the fifth and eighth switches;
set (i) the second and third switches and (ii) the six and seventh switches to a state that is the logical complement to a state of the first, fourth, fifth, and eighth switches;
selectively alternate the states of (a) the first, fourth, fifth and eighth switches and (b) the second, third, six, and seventh switches.

8. The charge pump of claim 7, wherein the controller is further configured to:
during alternation of the states, simultaneously retain said switches in an "open" state for a pre-selected duration of time.

9. The charge pump of claim 1, wherein the feedback module further includes a compensation network connected between the output of the differential error amplifier and the ground rail.

10. The charge pump of claim 1, wherein the feedback module further comprises a switch connected between the output of the differential error amplifier and the ground rail.

11. The charge pump of claim 10, wherein the controller in absence of the clock signal sets the switch to a "closed" state.

12. A method of controllably amplifying a DC voltage in an integrated circuit (IC) device, the method comprising:
providing a circuit having:
a first network including a first switch connected in series with a second switch, the first network having (i) a first input connected to a voltage rail of a DC voltage source of the IC device and (ii) a first output;
a second network including a third switch connected in series with a fourth switch, the second network having (i) a second input connected to the voltage rail and (ii) a second output;
a first capacitor connected between a common node of the first and second switches and a common node of the third and fourth switches;
an output capacitor connected between the first output and a ground rail of the DC voltage source, the output capacitor coupled to an output terminal of said charge pump;
a regulating transistor connected between the second output and the ground rail; a feedback module including a differential error amplifier having a first input network, a second input network, and an output connected to a gate terminal of the transistor; and
setting the first and fourth switches to the same state;
setting the second and third switches to a state that is the logical complement to a state of the first and fourth switches; and
alternating states of the first and fourth switches and the second and third switches in a pre-selected timing relationship with a clock signal of the IC device.

13. The method of claim 12, wherein:
the first input network comprises a first resistor connected in series with a second resistor coupled to the ground rail, a common node of the first and second resistors is connected to a non-inverting input of the error amplifier, and an input node of the first resistor is connected to the voltage rail or an output a source of a reference voltage; and
the second input network comprises a third resistor connected in series with a fourth resistor coupled to the ground rail, a common node of the third and fourth resistors is connected to an inverting input of the error amplifier, and an input node of the third resistor is connected to the output capacitor.

14. The method of claim 12, wherein the circuit further comprises:
a third network including a fifth switch connected in series with a sixth switch, the third network having (i) a third input connected to the voltage rail and (ii) a third output connected to the second output;
a fourth network including a seventh switch connected in series with an eighth switch, the fourth network having (i) a fourth input connected to the voltage rail and (ii) a fourth output connected to the first output; and
a second capacitor connected between a common node of the fifth and sixth switches and a common node of the seventh and eighth switches.

15. The method of claim 14, further comprising:
setting to the same state (i) the first and fourth switches and (ii) the fifth and eighth switches;
setting (i) the second and third switches and (ii) the six and seventh switches to a state that is the logical complement to a state of the first, fourth, fifth, and eighth switches.

16. An integrated circuit (IC) device, comprising:
a first plurality of functional circuits operable at a nominal supply voltage;
a second plurality of functional circuits operable at a supply voltage greater than the nominal supply voltage; and
a voltage boost charge pump powering the second plurality of the functional circuits, the charge pump comprising:
a first network including a first switch connected in series with a second switch, the first network having (i) a first input connected to a voltage rail of a DC voltage source of the IC device and (ii) a first output;
a second network including a third switch connected in series with a fourth switch, the second network having (i) a second input connected to the voltage rail and (ii) a second output;
a first capacitor connected between a common node of the first and second switches and a common node of the third and fourth switches;
an output capacitor connected between the first output and a ground rail of the DC voltage source, the output capacitor coupled to an output terminal of said charge pump;
a regulating transistor connected between the second output and the ground rail;
a feedback module including a differential error amplifier having a first input network, a second input network, and an output connected to a gate terminal of the transistor; and a controller configured for alternating states of said switches in a pre-selected timing relationship with a clock signal of the IC device.

17. The IC device of claim 16, wherein:

the first input network comprises a first resistor connected in series with a second resistor coupled to the ground rail, a common node of the first and second resistors is connected to a non-inverting input of the error amplifier, and an input node of the first resistor is connected to the voltage rail or an output a source of a reference voltage; and the second input network comprises a third resistor connected in series with a fourth resistor coupled to the ground rail, a common node of the third and fourth resistors is connected to an inverting input of the error amplifier, and an input node of the third resistor is connected to the output capacitor.

18. The IC device of claim 16, wherein the charge pump further comprises:

a third network including a fifth switch connected in series with a sixth switch, the third network having (i) a third input connected to the voltage rail and (ii) a third output connected to the second output;

a fourth network including a seventh switch connected in series with an eighth switch, the fourth network having (i) a fourth input connected to the voltage rail and (ii) a fourth output connected to the first output; and a second capacitor connected between a common node of the fifth and sixth switches and a common node of the seventh and eighth switches.

* * * * *